(12) United States Patent
Irie et al.

(10) Patent No.: US 11,065,943 B2
(45) Date of Patent: Jul. 20, 2021

(54) VEHICLE WINDSHIELD AND VEHICLE COMPONENT USING SAME

(71) Applicant: AGC Inc., Chiyoda-ku (JP)

(72) Inventors: Tetsuji Irie, Chiyoda-ku (JP); Nana Sato, Chiyoda-ku (JP); Jun Okawa, Chiyoda-ku (JP); Hideyuki Saito, Chiyoda-ku (JP); Akio Nagata, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 83 days.

(21) Appl. No.: 16/666,715

(22) Filed: Oct. 29, 2019

(65) Prior Publication Data

US 2020/0062086 A1     Feb. 27, 2020

Related U.S. Application Data

(63) Continuation of application No. 15/937,141, filed on Mar. 27, 2018, now Pat. No. 10,507,709, which is a
(Continued)

(30) Foreign Application Priority Data

Oct. 9, 2015  (JP) .............................. JP2015-200806
Oct. 4, 2016  (JP) .............................. JP2016-196702

(51) Int. Cl.
*B60J 1/02*     (2006.01)
*B60J 1/00*     (2006.01)
(Continued)

(52) U.S. Cl.
CPC ................. *B60J 1/002* (2013.01); *B32B 7/02* (2013.01); *B32B 7/023* (2019.01); *B32B 7/12* (2013.01);
(Continued)

(58) Field of Classification Search
CPC ...... B32B 7/023; B60J 1/002; B60J 2307/412; B60J 17/10348
(Continued)

(56) References Cited

U.S. PATENT DOCUMENTS 4,864,316 A     9/1989 Kaoru et al.
2009/0239017 A1  9/2009 Ishioka
(Continued)

FOREIGN PATENT DOCUMENTS

CA    2 932 770 A1    6/2015
CN    104736399 A     6/2015
(Continued)

OTHER PUBLICATIONS

International Search Report dated Dec. 27, 2016 in PCT/JP2016/079813, filed on Oct. 6, 2016 (with English Translation).
(Continued)

*Primary Examiner* — Dennis H Pedder
(74) *Attorney, Agent, or Firm* — Oblon, McClelland, Maier & Neustadt, L.L.P.

(57) ABSTRACT

Provided are a vehicle windshield equipped with a transparent film at a visual field area, where a negative effect on a driving visibility due to a boundary line between a forming area and a non-forming area of the transparent film is improved, and a vehicle component having the vehicle windshield. The vehicle windshield includes: a window plate; and a transparent film provided at a surface on a vehicle-interior side of the window plate, wherein the vehicle windshield includes a first area where the transparent film is not provided and a second area where the transparent film is provided, at a central area when viewed from a front side, and a boundary between the first area and the second area has no perspective distortion and is constituted by a
(Continued)

boundary line having line width visually recognized by scattering of irradiated light of 10 μm to 200 μm.

16 Claims, 10 Drawing Sheets

Related U.S. Application Data continuation of application No. PCT/JP2016/079813, filed on Oct. 6, 2016.

(51) Int. Cl.
*B32B 7/023* (2019.01)
*C03C 17/32* (2006.01)
*B32B 17/10* (2006.01)
*B32B 7/02* (2019.01)
*B32B 7/12* (2006.01)

(52) U.S. Cl.
CPC .... *B32B 17/10036* (2013.01); *B32B 17/1044* (2013.01); *B32B 17/10064* (2013.01); *B32B 17/10128* (2013.01); *B32B 17/10165* (2013.01); *B32B 17/10348* (2013.01); *C03C 17/32* (2013.01); *C03C 17/322* (2013.01); *C03C 17/326* (2013.01); *B32B 2307/412* (2013.01); *B32B 2605/006* (2013.01); *B32B 2605/08* (2013.01); *C03C 2217/75* (2013.01)

(58) Field of Classification Search
USPC .................................. 296/84.1, 96.18, 96.19
See application file for complete search history.

(56) References Cited

U.S. PATENT DOCUMENTS

| | | |
|---|---|---|
| 2012/0193341 A1 | 8/2012 | Reul et al. |
| 2014/0266931 A1 | 9/2014 | Shkembi |
| 2015/0210144 A1 | 7/2015 | Ishioka |
| 2016/0013539 A1 | 1/2016 | Shkembi |
| 2016/0374150 A1 | 12/2016 | Guillaume et al. |

FOREIGN PATENT DOCUMENTS

| | | |
|---|---|---|
| EP | 2 095 981 A1 | 9/2009 |
| EP | 2 674 403 A1 | 12/2013 |
| EP | 2 907 706 A1 | 8/2015 |
| JP | 3-23940 | 1/1991 |
| JP | 6-212400 | 8/1994 |
| JP | 6-316437 | 11/1994 |
| JP | 10-60141 | 3/1998 |
| JP | 2003-172713 | 6/2003 |
| JP | 2008-536732 | 9/2008 |
| JP | 2012-180260 | 9/2012 |
| WO | WO 2006/112529 A1 | 10/2006 |
| WO | WO 2008/069186 A1 | 6/2008 |
| WO | WO 2012/107968 A1 | 8/2012 |
| WO | WO 2014/061509 A1 | 4/2014 |
| WO | WO 2016/035527 A1 | 3/2016 |

OTHER PUBLICATIONS

Extended European Search Report dated May 9, 2019 in corresponding European Patent Application No. 16853705.8, 10 pages.

VEHICLE WINDSHIELD AND VEHICLE COMPONENT USING SAME

CROSS-REFERENCE TO RELATED APPLICATIONS

This application is a continuation application of U.S. patent application Ser. No. 15/937,141, filed on Mar. 27, 2018, which is a continuation of prior International Application No. PCT/JP2016/079813, filed on Oct. 6, 2016 which is based upon and claims the benefit of priority from Japanese Patent Applications No. 2015-200806, filed on Oct. 9, 2015 and No. 2016-196702, filed on Oct. 4, 2016; the entire contents of all of which are incorporated herein by reference.

FIELD

The present invention relates to a vehicle windshield and a vehicle component using the same.

BACKGROUND

There is a document disclosing that a surface-treated layer is provided at a part of a vehicle windshield on a vehicle-interior side and an antifogging coating film is provided at a surface thereof (Patent Reference 1; JP-A No. H03-23940). Here, Patent Reference 1 discloses that the surface-treated layer and the antifogging coating film are uniformly coated by means of a flow coating method (lines 11 to 15 on page 11).

SUMMARY

However, Patent Reference 1 does not disclose regarding a boundary line (boundary area) between an area where the surface-treated layer or the antifogging coating film are formed and an area where they are not formed. When this boundary line exists in a visual field area of a vehicle windshield, there is a case when a problem occurs in which a landscape seen through the vehicle windshield looks distorted along the boundary line, what is called perspective distortion occurs, depending on a formation method of the layer and the coating film.

The present invention is made in consideration of the above problem, and an object thereof is to provide a vehicle windshield and a vehicle component having the vehicle windshield where the boundary line between a forming area and a non-forming area of a transparent film is improved in the vehicle windshield having the transparent film at the visual field area.

An aspect of the present invention is a vehicle windshield, including: a window plate; and a transparent film provided at a surface on a vehicle-interior side of the window plate, wherein the vehicle windshield includes a first area where the transparent film is not provided and a second area where the transparent film is provided, at a central area when viewed from a front side, and a boundary between the first area and the second area has no perspective distortion and is constituted by a boundary line having line width visually recognized by scattering of irradiated light of 10 μm to 200 μm.

Another aspect of the present invention is a vehicle component including: a vehicle windshield including a window plate and a transparent film provided at a surface on a vehicle-interior side of the window plate; and a sensor acquiring information from a vehicle front side through the vehicle windshield,
wherein the vehicle windshield includes a first area where the transparent film is not provided and a second area where the transparent film is provided, at a central area when viewed from a front side,
a boundary between the first area and the second area has no perspective distortion and is constituted by a boundary line having line width visually recognized by scattering of irradiated light of 10 μm to 200 μm, and
the sensor is attached to the vehicle-interior side of the second area of the vehicle windshield.

The other aspect of the present invention is a vehicle windshield including: a window plate; a light-shielding area provided at a peripheral part of the window plate; and a transparent film provided at a surface on a vehicle-interior side of the window plate,
wherein the light-shielding area includes a sensor light transmission area which is cut out into a shape whose periphery is surrounded by the light-shielding area, at least a part of the transparent film is provided such that a whole outer periphery is located in the sensor light transmission area, and an end part of the transparent film provided at the sensor light transmission area has no perspective distortion and is constituted by a boundary line having line width visually recognized by scattering of irradiated light of 10 μm to 200 μm.

According to the present embodiment, it is possible to provide a vehicle windshield in which a boundary line between a forming area and a non-forming area of a transparent film is improved in the vehicle windshield having the transparent film at a visual field area.

DETAILED DESCRIPTION

Hereinafter, concrete embodiments of a vehicle windshield according to the present invention are described by using the drawings.

Figure 1:
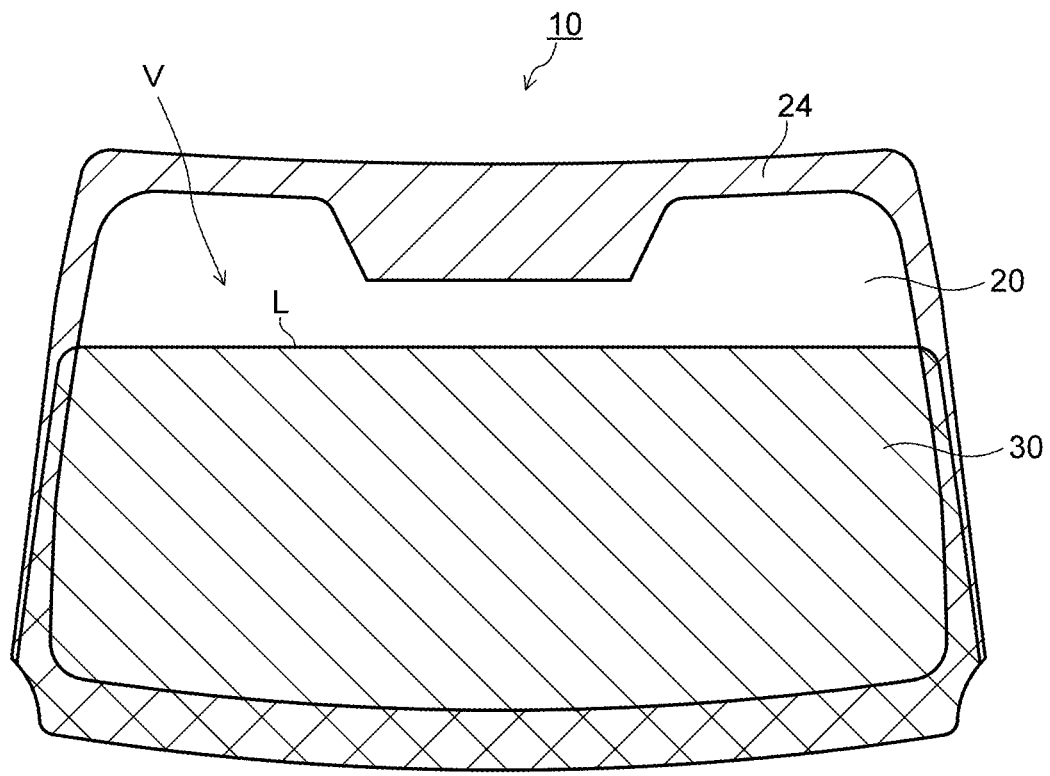
FIG. 1 is a configuration diagram of an example of an embodiment of a vehicle windshield according to the present invention.
Figure 2:
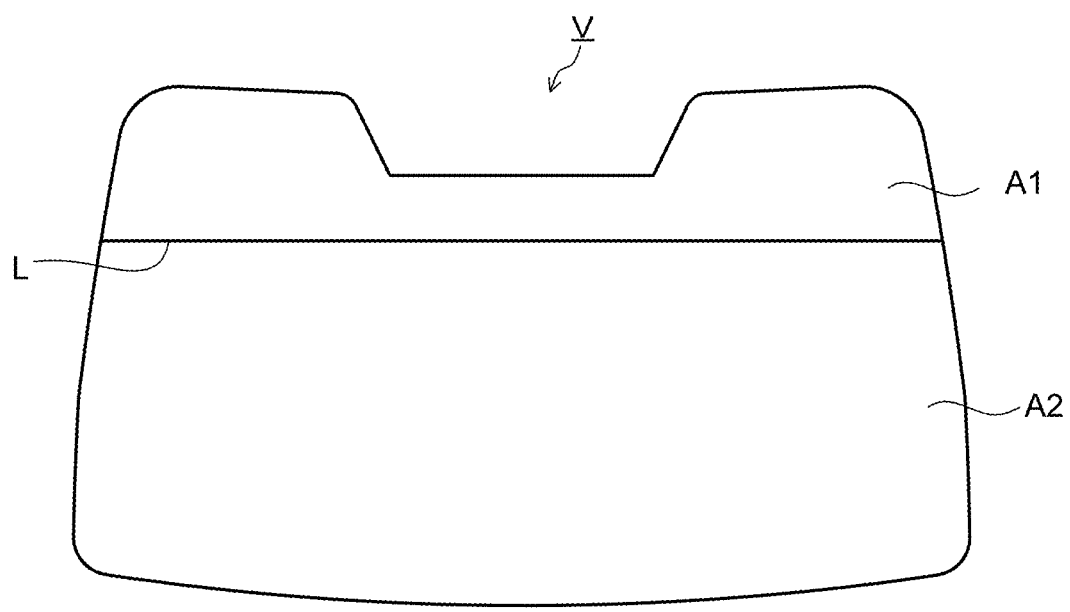
FIG. 2 is a front view of a perspective area of the vehicle windshield illustrated in FIG. 1.
Figure 3:
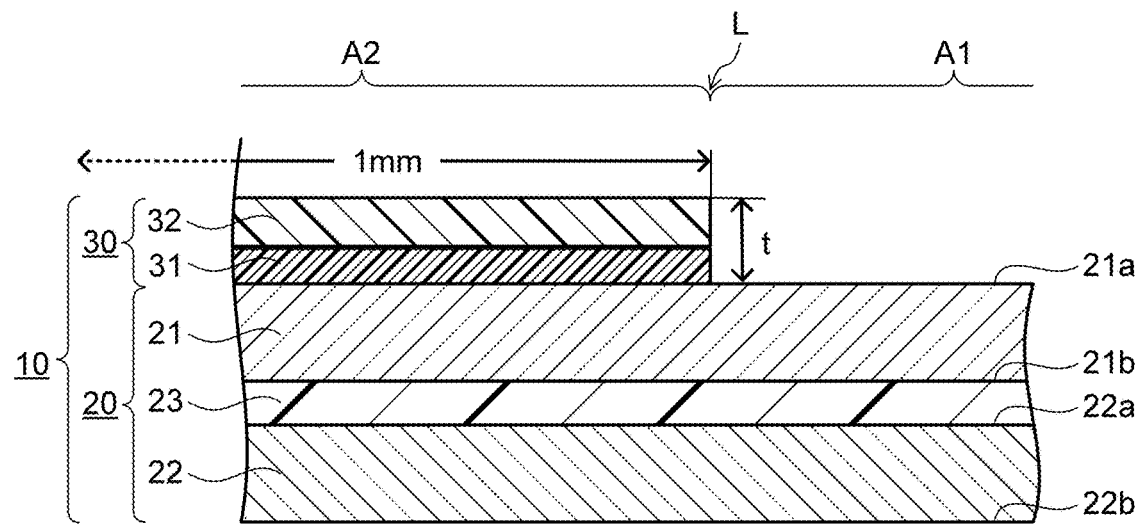
FIG. 3 is an enlarged sectional view in a vicinity of a boundary line L of the vehicle windshield illustrated in FIG. 1.

FIG. 1 is a configuration diagram of an example of an embodiment of a vehicle windshield according to the present invention. FIG. 2 is a front view of a perspective area of the vehicle windshield illustrated in FIG. 1, and FIG. 3 is an enlarged sectional view in a vicinity of a boundary line of the vehicle windshield illustrated in FIG. 1.

A vehicle windshield 10 illustrated in FIG. 1 includes a window plate 20 and a transparent film 30 provided at a surface on a vehicle-interior side of the window plate 20. The window plate 20 includes a black ceramic layer 24 being a band-shaped layer formed at a whole of a peripheral part.

The transparent film 30 is provided approximately in a trapezoid shape leaving an upper part of a perspective area V of the vehicle windshield 10 where visibility of a vehicle driver is secured, in a band shape, when viewed from a front side. The perspective area V is concretely, an area on a center side of the vehicle windshield 10 except the peripheral part where the black ceramic layer 24 is provided. At the vehicle windshield 10, the transparent film 30 is provided such that lateral sides are in a forming area of the black ceramic layer 24 and a lower side accords with a lower side of the window plate 20. Here, the perspective area V corresponds to a "central area" described in Claims, that is, a central area when the vehicle windshield is viewed from a front side, in the vehicle windshield 10.

In the vehicle windshield 10, an area where the black ceramic layer 24 is faulted is a light-shielding area. The light-shielding area is, for example, provided to hide a part of the vehicle windshield 10 which is required to be hidden such as a part to be attached to a vehicle body, and it is an area shielding at least visible light. A degree of shielding of the visible light at the light-shielding area can be appropriately adjusted according to an object to be provided. For example, the degree of shielding light may be adjusted not to transmit the visible light to an extent capable of hiding at least the part which is required to be hidden when the light-shielding area is provided for the purpose of hiding.

An "upper part" of the perspective area of the vehicle windshield 10 is an upper part when the vehicle windshield 10 is mounted on a vehicle, and a "lower part" is a lower part when the vehicle windshield 10 is mounted on the vehicle. Similarly, notations of an "upside" and a "downside" in this description indicate an upside and a downside when a vehicle windshield glass is mounted on the vehicle. In this description, the peripheral part of the vehicle windshield means an area having a certain width from an end part toward a center part of a main surface of the vehicle windshield. In this description, the central area of the vehicle windshield is an inside area of the peripheral part.

FIG. 2 illustrates a front view of the perspective area V of the vehicle windshield 10 illustrated in FIG. 1. The vehicle windshield 10 includes a non-coating area A1 where the transparent film 30 is not provided and a coating area A2 where the transparent film 30 is provided, at the perspective area V. The non-coating area A1 is provided at the upper part of the perspective area V, and the coating area A2 is provided at the lower part of the perspective area V. The non-coating area A1 is located diagonally above when viewed from a driver of the vehicle. The non-coating area A1 corresponds to "a first area where a transparent film is not provided" at a central area of a vehicle windshield defined in Claims, and the coating area A2 corresponds to "a second area where the transparent film is provided" at the central area of the vehicle windshield defined in Claims.

The transparent film 30 in the vehicle windshield 10 is, for example, an antifogging film having a function of securing visibility of a driver by preventing the vehicle windshield from fogging in high humidity, and the vehicle driver normally uses the coating area A2 as a visibility range. Concretely, an area including a test area A is preferable and an area including a test area B is more preferable, as the visibility range of the vehicle driver. The test area A and the test area B are test areas each defined as a "test area of safety glass used for a front face" specified in JIS R3212 (1998, "Test method of safety glass for automobiles"). The test area A has a smaller area than the test area B, and is an area where required minimum visibility of the driver is preferably ensured so as to secure the safety.

In the vehicle windshield 10, the non-coating area A1 exists at an outside of an area which is normally used by the vehicle driver as the visibility range of the vehicle windshield 10, concretely, an area at the upper part of the perspective area V having a predetermined line width along an upper side of the window plate 20. The non-coating area A1 is an area provided for purposes of directly sticking stickers such as a vehicle inspection certificate and a vehicle inspection seal and disposing a vehicle-mounted antenna or the like on a vehicle inner surface of the window plate 20, and a purpose for notifying the vehicle driver of a use start timing of defogger because the non-coating area A1 is likely to fog up compared to the coating area A2. The first area where the transparent film is not provided at the central area of the vehicle windshield is preferably located diagonally above when viewed from the vehicle driver such as the non-coating area A1 from viewpoints as above.

A width of the non-coating area A1 can be adjusted, for example, in accordance with the above-stated various purposes while securing the area normally used by the vehicle driver as the visibility range. Concretely, the width of the non-coating area A1 is preferably 20 mm or more, and more preferably 30 mm or more within the range securing the area.

As illustrated in FIG. 1, the transparent film 30 may include the area provided to overlap with the forming area of the black ceramic layer 24 in the vehicle windshield 10. That is, a part of an end part of the transparent film 30 may be formed to overlap with the black ceramic layer 24 being the light-shielding area. It is preferable because both lateral sides and the lower side of the transparent film 30 are thereby not outstanding.

In the vehicle windshield 10, a boundary between a forming area and a non-forming area of the transparent film 30 corresponds to an outer periphery of the transparent film 30. When the transparent film 30 is formed from the perspective area V toward the area other than the perspective area V, that is, toward the forming area of the black ceramic layer 24 such as the vehicle windshield 10, it becomes essential that the outer periphery existing at the perspective area V has characteristics of the boundary line according to the present invention described below from among the outer periphery of the transparent film 30. The outer periphery of the transparent film 30 existing at other than the perspective area V may or may not have the characteristics. Incidentally, "the area provided to overlap with the forming area of the black ceramic layer 24" in this application does not necessarily mean to be provided while being physically in contact therewith, and may also include a state where they are located to overlap in a planar view.

As illustrated in FIG. 1 and FIG. 2, the boundary between the coating area A2 and the non-coating area A1 is constituted by a boundary line L extending in a vehicle width direction when the vehicle windshield 10 is mounted on a vehicle. The boundary line L is a boundary line having the characteristics of the present invention where there is no perspective distortion at a boundary between the two areas divided by the boundary line, and a line width visually recognized by scattering of irradiated light is 10 µm to 200 µm. In this description, an evaluation method of presence or absence of the perspective distortion due to the boundary line, that is, the perspective distortion at the boundary between two areas divided by the boundary line, and a measuring method of the line width of the boundary line visually recognized by scattering of irradiated light are as described below. The line width of the boundary line in this description is a line width at the boundary line between the coating area (second area) and the non-coating area (first area) measured by the method unless otherwise particularly specified.

(Presence or Absence of Perspective Distortion)

A test plate A being a grid pattern with an interval of 10 mm formed on a white background by 0.7 mm width black lines in which each black line forms an angle of 45 degrees with respect to a lower side is prepared, and the test plate A and the vehicle windshield are located such that a grid pattern forming surface of the test plate A and a surface of the vehicle windshield on a side where the transparent film is not formed are in parallel with each other with a distance of 20 mm. The grid pattern forming surface of the test plate A is photographed through the vehicle windshield with a camera provided at a distance of 150 mm from a surface of the vehicle windshield on a side where the transparent film is formed such that the boundary line between the coating area and the non-coating area is located approximately at a center in a photographing range. An obtained image is visually checked, and determines that "the perspective distortion is present" when deformation or discontinuity is recognized in the grid pattern, and "the perspective distortion is absent" when neither the deformation nor the discontinuity is recognized in the grid pattern.

Figure 6A:
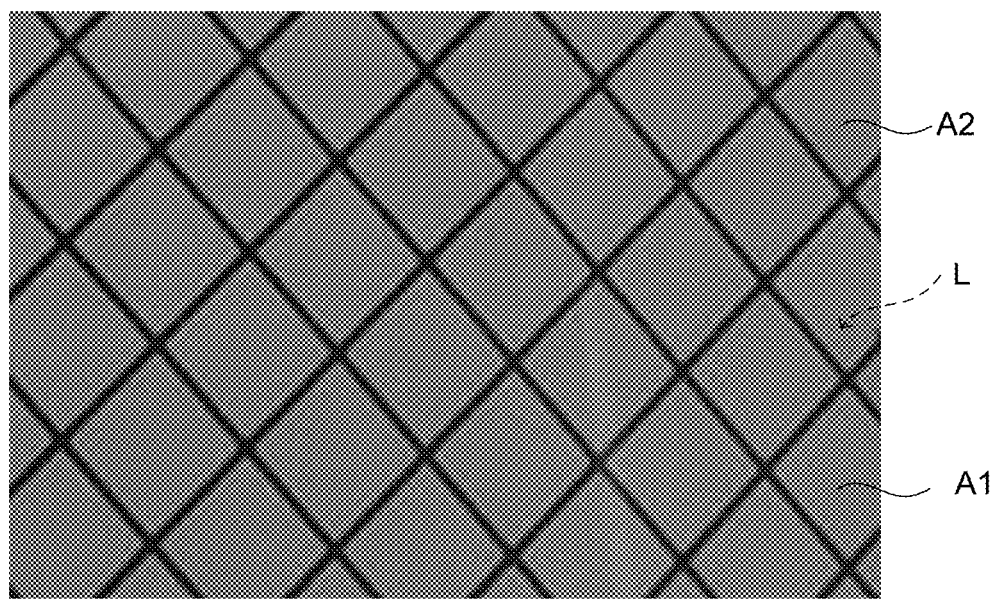
FIG. 6A is a photographed image to evaluate perspective distortion in Example 1.
Figure 9A:
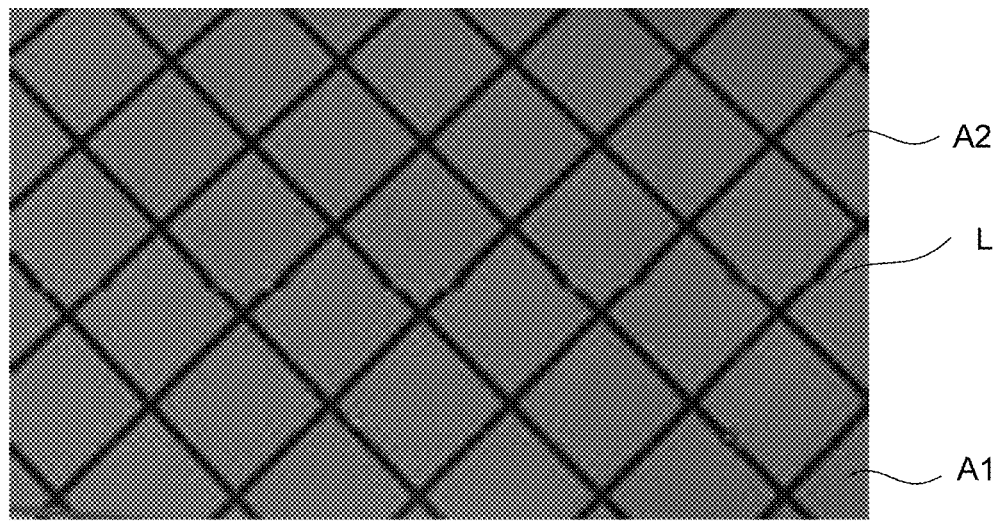
FIG. 9A is a photographed image to evaluate perspective distortion in Comparative Example 1.

As a concrete example, FIG. 6A is an image to evaluate presence or absence of the perspective distortion in later-described Example 1 (an example where an antifogging film made up of two layers is formed by means of a wet coating method on one main surface of a window plate so as to exclude a part of an area, and an end part of the obtained antifogging film which is in contact with the area is decoated with a cutter), and it is evaluated as "the perspective distortion is absent" because neither the deformation nor the discontinuity is recognized in the grid pattern. FIG. 9A is an image to evaluate presence or absence of the perspective distortion in later-described Comparative example 1 (an example where an antifogging film made up of two layers is formed on one main surface of a window plate so as to exclude a part of an area by means of a wet coating method, and an end part of the obtained antifogging film which is in contact with the area is not decoated), and it is evaluated as "the perspective distortion is present" because the deformation is recognized in the grid pattern.

(Line width of Boundary Line)

A test plate B having an all black main surface is prepared, and the test plate B and the vehicle windshield are located such that the black surface of the test plate B and the surface of the vehicle windshield on the side where the transparent film is not formed are in parallel with each other with a distance of 20 mm. The black surface of the test plate B is photographed through the vehicle windshield with a camera provided at a distance of 150 mm from the surface of the vehicle windshield on the side where the transparent film is formed while irradiating visible light between the test plate B and the vehicle windshield such that the boundary line between the coating area and the non-coating area is located approximately at a center in the photographing range. The obtained image is enlarged five times to measure a maximum line width within a length of 100 mm of the boundary line, and it is set as the line width of the boundary line.

Figure 8A:
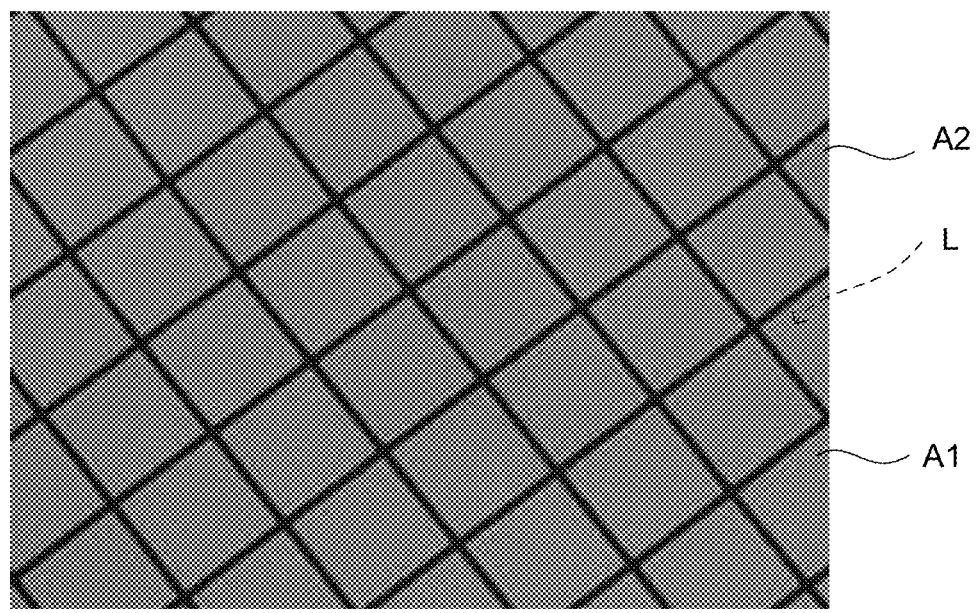
FIG. 8A is a photographed image to evaluate perspective distortion in Example 3.
Figure 8B:
FIG. 8B is an image photographed under line width measuring conditions of a boundary line in Example 3.
Figure 8C:
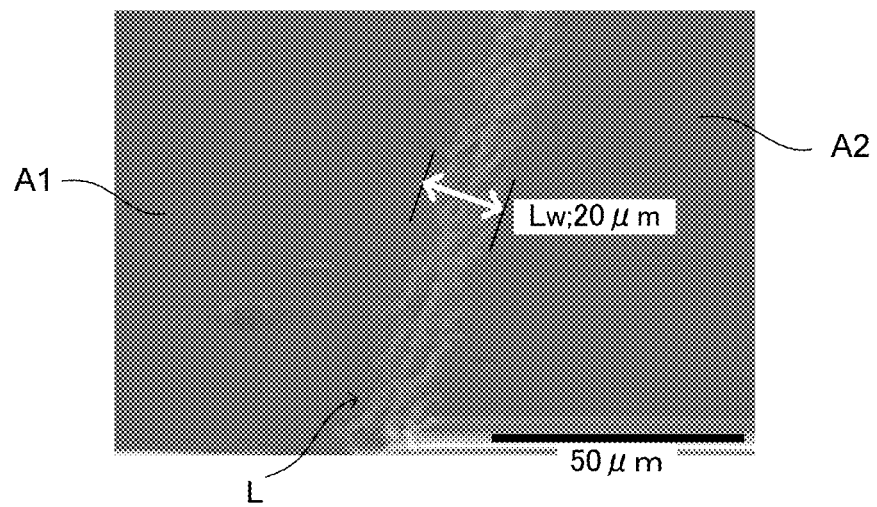
FIG. 8C is an enlarged image (1000 times) photographed under the line width measuring conditions of the boundary line in Example 3.

As a concrete example, FIG. 8B is an image photographing the boundary line in Example 3 (an example where an antifogging film made up of two layers is formed on one main surface of a window plate so as to exclude a part of an area by means of a wet coating method, and an end part of the obtained antifogging film which is in contact with the area is de-coated with a cutter) under the above-stated line width measuring conditions, and it is an image illustrating that the boundary line with a predetermined line width is visually recognized by scattering of the irradiated light. FIG. 8C is an enlarged image (1000 times) which is photographed under the line width measuring conditions of the boundary line in Example 3. The measurement of the line width of the boundary line is carried out by using a five times enlarged image, but the measuring method of the line width is described by using FIG. 8C which is further enlarged. The line width of the boundary line is measured as the maximum line width within the length of 100 mm measured in a direction orthogonal to a length direction of the boundary line. In FIG. 8C, a line width Lw of the boundary line is measured to be 20 µm in Example 3.

In the vehicle windshield of this invention, the line width of the boundary line is 10 µm to 200 µm. When the line width of the boundary line falls within the range, it can be sufficiently visually recognized as the boundary and there is seldom effect on a driving visibility. In addition, the boundary line has good design properties such that a person can visually recognize it as a beautiful line. The line width of the boundary line is preferably 10 µm to 150 µm. Workability to locate stickers and a vehicle-mounted antenna on the non-coating area (first area) is improved owing that the boundary line is visually recognized as the boundary.

In the vehicle windshield 10, the boundary line L extends from approximately one end part to approximately the other end part in the vehicle width direction of the window plate 20. That is, the boundary line L having the above characteristics may reach not only the perspective area V but also an inside of the forming area of the black ceramic layer 24. Presence or absence of the perspective distortion and the line width of the boundary line cannot be measured in the forming area of the black ceramic layer 24, but for example, the boundary line may have the similar structure as the boundary line L having the above characteristics as illustrated in FIG. 3.

In the perspective area V, the line width of the boundary line L may differ according to a position in the vehicle width direction within the predetermined range according to this invention. The line width on a front passenger seat side may be narrow and the line width on a driver seat side may be wide, in contrast, the line width on the front passenger seat side may be wide and the line width on the driver seat side may be narrow. Further, the line width on a center part side in the vehicle width direction may be wide and the line widths on both end sides may be narrow. A change of the line width of the boundary line L in the vehicle width direction may be defined in accordance with disposing positions of the stickers and the vehicle-mounted antenna stuck on the non-coating area A1 on the vehicle-interior surface of the vehicle windshield 10, and the change in the line width may be defined such that a person who carries out the sticking is easy to recognize the boundary line L, that is, the boundary between the coating area A2 and the non-coating area A1. Note that a part with the wide line width and a part with the narrow line width may exist with predetermined intervals (for example, 50 mm).

FIG. 3 is an enlarged sectional view of a cross-section in which a part in a vicinity of the boundary line L of the vehicle windshield 10 illustrated in FIG. 1 is cut at a plane orthogonal to the boundary line L. In FIG. 3, a film thickness t of the transparent film 30 formed on a vehicle-interior side main surface of the window plate 20 is approximately constant in the vicinity of the boundary line L, and a shape of an end face of the transparent film 30 is approximately vertical with respect to the main surface of the window plate 20.

The film thickness t of the transparent film 30 is approximately constant in the vicinity of the boundary line L means a state that, specifically, a value (%) where a photographed image of the cross-section of the vehicle windshield 10 which is cut at the plane orthogonal to the boundary line L similar to the cross-section illustrated in FIG. 3 is used, and in the film thickness from the end face of the transparent film 30 (a position of the boundary line L) to 1 mm toward inside, a value (%) that subtracted a minimum value ratio (%) when a maximum value is set as 100% from 100% is 5% or less. The value (%) is preferably 2% or less, and more preferably 1% or less. Hereinafter, the value (%) that subtracted the minimum value ratio (%) with respect to the maximum value (100%) from 100% regarding the film thickness of the transparent film between the position at 1 mm inside and the position of the boundary line L measured by the above method is called a "deviation of an end part film thickness" of the transparent film. The sectional view illustrated in FIG. 3 is a schematic view, and for example, an actual end face shape at the transparent film 30 is not illustrated as it is.

In the vehicle windshield 10, the transparent film 30 is provided on the window plate 20 as, for example, illustrated in FIG. 3, and thereby, the boundary line between the non-coating area A1 (first area) and the coating area A2 (second area) can be made to be the boundary line L where there is no perspective distortion at the boundary between the two areas divided by the boundary line and the line width visually recognized by scattering of irradiated light is 10 µm to 200 µm. A method of forming the transparent film 30 into the above-stated shape will be described later.

Though the sectional view illustrated in FIG. 3 is the sectional view in the vicinity of the boundary line L of the vehicle windshield 10, a stacked structure of the window plate 20 is the same as the stacked structure illustrated in FIG. 3 at a whole of the vehicle windshield 10, and a stacked structure of the transparent film 30 is the same as the stacked structure illustrated in FIG. 3 at a whole of the transparent film 30. Hereinafter, each member constituting the vehicle windshield 10 is explained.

The window plate 20 includes a first light transmissive substrate 21, a second light transmissive substrate 22 facing the first light transmissive substrate 21, and an interlayer 23 sandwiched between the first light transmissive substrate 21 and the second light transmissive substrate 22 to adhere and integrate the two substrates.

The first light transmissive substrate 21 is provided on a vehicle-interior side than the second light transmissive substrate 22. A surface 21a on the vehicle-interior side of the first light transmissive substrate 21 is called a first surface, and a facing surface 21b of the first light transmissive substrate 21 with the second light transmissive substrate 22 is called a second surface.

The second light transmissive substrate 22 is provided on a vehicle-exterior side than the first light transmissive substrate 21. A facing surface 22a of the second light transmissive substrate 22 with the first light transmissive substrate 21 is called a third surface, and a surface 22b on the vehicle-exterior side of the second light transmissive substrate 22 is called a fourth surface.

The first surface 21a, the second surface 21b, the third surface 22a and the fourth surface 22b are arranged in this order from the vehicle-interior side toward the vehicle-exterior side of the window plate 20.

The first light transmissive substrate 21 and the second light transmissive substrate 22 are each formed of glass or plastic. The first light transmissive substrate 21 and the second light transmissive substrate 22 may be both formed of the glass, may be both formed of the plastic, or either one may be formed of the glass and the other may be formed of the plastic. There are soda lime glass, borosilicate glass, non-alkali glass, quartz glass, and so on as the glass forming the light transmissive substrate. There are an acrylic-based resin such as polymethyl methacrylate, an aromatic polycarbonate-based resin such as polyphenylene carbonate, an aromatic polyester-based resin such as polyethylene terephthalate (PET), and so on as the plastic forming the light transmissive substrate.

In the vehicle windshield 10, the window plate 20 has a constitution in which two light transmissive substrates sandwich the interlayer, but the number of pieces of the light transmissive substrates constituting the window plate may be one piece, or three pieces or more. When the number of pieces of the light transmissive substrates is three pieces or more, the interlayer is necessary to be provided between the light transmissive substrates.

An approximately trapezoid shaped window plate 20 can be used. In addition, the window plate 20 bending-formed in a desired curved shape which is required as the vehicle windshield can be used. Concretely, the window plate 20 has a curvature shape where both end parts in the vehicle width direction are located on a vehicle rear side compared to a center part when the window plate 20 is placed on the vehicle. That is, the window plate 20 curves into a state where the center part in the vehicle width direction protrudes toward a vehicle front side. The window plate 20 has a curvature shape where a center part of an upper side in the vehicle width direction is located downward compared to both end parts. That is, an upper side shape of the window plate 20 curves such that the center part in the vehicle width direction hangs down the most. The window plate 20 has a thickness of, for example, approximately 1 mm to 10 mm. The shape, the thickness, and so on of the window plate 20 are appropriately designed in accordance with the vehicle to be mounted.

A band width of the band-shaped black ceramic layer 24 formed at a whole of the peripheral part of the window plate 20 is preferably in a range of 5 mm to 300 mm, and more preferably 10 mm to 200 mm. The black ceramic layer 24 has a role to hide an attaching part of the vehicle windshield 10 to the vehicle body (for example, an adhesive part such as urethane). The black ceramic layer 24 is not required to be provided at the whole of the peripheral part of the window plate 20, and may be provided at a part of the peripheral part. The band width of the black ceramic layer 24 is not necessarily the same width in each of upper, lower, right and left sides. Further, the band width is not required to be the same width from end to end in a certain side. In the vehicle windshield 10, the width of the black ceramic layer 24 is set such that a center part is wide to hide the attaching part of various sensors at the upper side, and the other parts are narrow.

The black ceramic layer 24 may be provided on any of the first surface 21a, the second surface 21b, the third surface 22a and the fourth surface 22b.

The black ceramic layer 24 may be formed by, for example, applying a black ceramic paste where a heat-resistant black pigment powder is added to a resin and a solvent together with a low-melting-point glass powder to be kneaded, on a desired area on the light transmissive substrate by printing or the like, and heating the black ceramic paste to bake. The black ceramic layer 24 may be formed as an integrated film where a whole layer is continuous, or may be formed by a dot pattern being an aggregate of fine dots, or the like.

As illustrated in FIG. 3, the transparent film 30 of the vehicle windshield 10 has the stacked structure made up of two layers of a base layer 31 and an upper layer 32. The base layer 31 is a layer which is in contact with the window plate 20. The upper layer 32 is a layer which is disposed to overlap with the base layer 31, and is a layer disposed on the vehicle-interior side farthest from the window plate 20. The transparent film at the vehicle windshield of this invention is not limited to two layers, and may be a single layer, or three layers or more such as three layers and four layers.

A film thickness of the transparent film 30 is preferably 3 μm to 30 μm, more preferably 5 μm to 30 μm, and particularly preferably 7 μm to 30 μm as a total film thickness of the base layer 31 and the upper layer 32. The film thickness preferably falls within the similar range when the transparent film is made up of a single layer or three layers or more.

When the transparent film 30 is made up of the two layers of the base layer 31 and the upper layer 32, the base layer 31 is generally an adhesive layer between the upper layer 32 and the window plate 20, and the upper layer 32 is a functional layer supplying the window plate 20 with various functions. Concretely, there can be cited an organic resin-based coating film for both of the base layer 31 and the upper layer 32 as the transparent film 30. There can be cited an antifogging film using a water-absorbing resin as the organic resin-based coating film. There can be cited an epoxy resin, a urethane resin, an acrylic resin, and so on as the water-absorbing resin used as the antifogging film, and all of them have high transparency.

Here, when the transparent film 30 is the organic resin-based coating film and a sticker is placed on the transparent film 30, there is a high possibility that the transparent film 30 under the sticker is peeled off together when the sticker is peeled off for re-sticking or the like. In this case, for example, the non-coating area A1 is preferably set to be a size at least capable of sticking the stickers and disposing the vehicle-mounted antenna, or the like at the perspective area V within the above-stated width range.

When the transparent film 30 is the antifogging film, the non-coating area A1 is likely to fog up compared to the coating area A2 because the antifogging film does not exist. The vehicle driver is thereby able to further remarkably sense the antifogging property of the coating area A2, and a commodity value of the vehicle windshield formed of the window plate with the antifogging film can be increased. Since the vehicle driver is able to know the use start timing of the defogger due to the non-coating area A1 which starts fogging up, it is useful from a viewpoint of improving safety during driving.

In the vehicle windshield 10, the transparent film 30 is formed such that the boundary line L having the above-stated predetermined characteristics has a shape fitted to the upper side shape of the window plate 20. In the vehicle windshield of this invention, at least a part of the boundary line having the predetermined characteristics is preferably formed into the shape fitted to the upper side shape of the window plate from a viewpoint of a design property. That is, it is preferable that at least a part of the boundary line is formed along the upper side of the window plate approximately in parallel therewith, and formed to have approximately the same curvature as a curvature of the curved shape (a shape recessed downward) of the upper side of the window plate, and it is more preferable that all of the boundary line is formed along the upper side of the window plate.

The transparent film may not exist at an area where an adhesive to attach the vehicle windshield to the vehicle body is provided. It is because a sufficient adhesive action cannot be secured if the transparent film exists at the area where the adhesive to attach the vehicle windshield to the vehicle body is provided.

The forming area of the transparent film in the vehicle windshield according to this invention is not limited to the forming area of the transparent film at the vehicle windshield 10. The transparent film may be provided at a part of the perspective area, and the lateral sides and the lower side of the transparent film may be formed not in the forming area of the black ceramic layer, but on a side or in the vicinity of the black ceramic layer along the side of the black ceramic layer in the vehicle windshield according to this invention.

In the perspective area, the non-coating area may exist not only at the upper part of the perspective area such as the vehicle windshield 10 but also at lateral side parts or at a lower side part. For example, the vehicle windshield may be constituted such that a whole of the transparent film is formed in the perspective area such as a vehicle windshield 10A of another example of the embodiment of the vehicle windshield of this invention illustrated in FIG. 4A described below. The non-coating area may exist only at the upper part on the front passenger seat side of the perspective area.

Figure 4A:
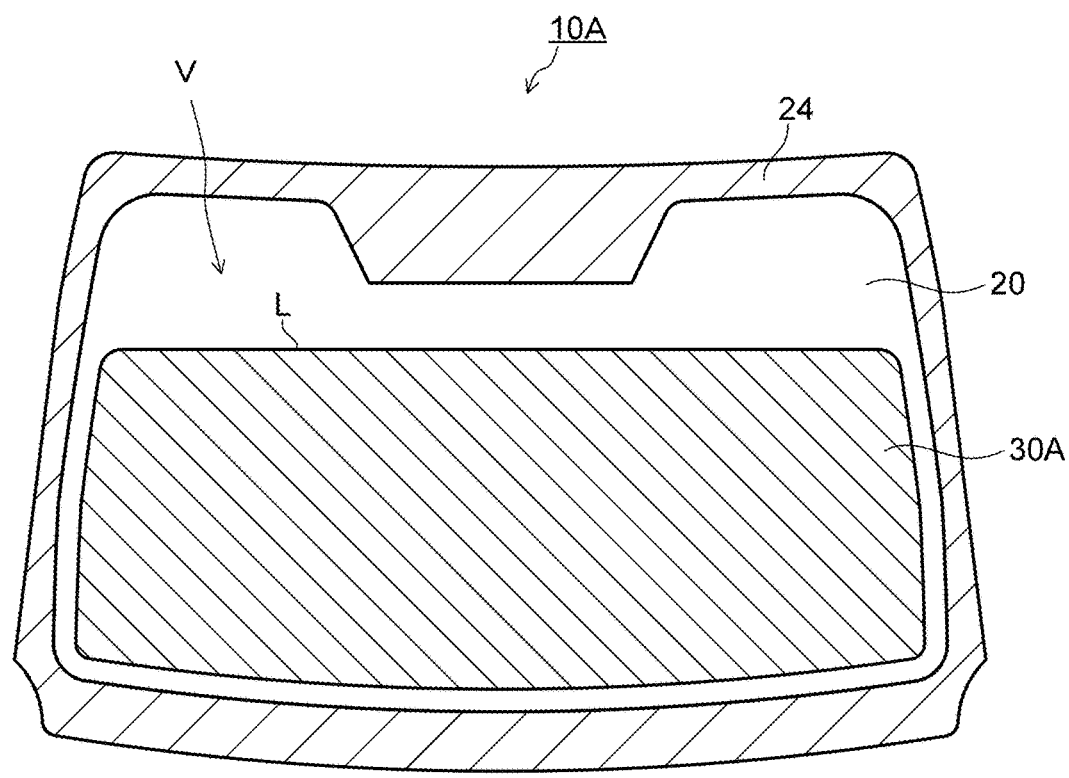
FIG. 4A is a configuration diagram of another example of the embodiment of the vehicle windshield of the present invention.

FIG. 4A is a configuration diagram of another example of the embodiment of the vehicle windshield of this invention. The vehicle windshield 10A illustrated in FIG. 4A includes the window plate 20 and a transparent film 30A provided at a surface on the vehicle-interior side of the window plate 20. The window plate 20 includes the black ceramic layer 24 being the band-shaped layer formed at the whole of the peripheral part. The vehicle windshield 10A is the same as the vehicle windshield 10 illustrated in FIG. 1 except a forming area of the transparent film 30A.

In the vehicle windshield 10A, a whole forming area of the transparent film 30A exists in the perspective area (central area) V. That is, the forming area of the transparent film 30A accords with the second area being the forming area of the transparent film at the central area. An area except the second area in the perspective area V is the first area where the transparent film is not formed, and a shape of the first area is a frame shape surrounding the second area. The boundary between the first area and the second area accords with an outer periphery of the transparent film 30A. In the vehicle windshield 10A, a whole of the outer periphery of the transparent film 30A is constituted by the boundary line L having the above-stated predetermined characteristics, that is, the boundary line having the characteristics of the present invention where there is no perspective distortion at the boundary between the two areas divided by the boundary line and the line width visually recognized by scattering of irradiated light is 10 μm to 200 μm.

A cross-section cut at a plane orthogonal to the outer periphery in a vicinity of the outer periphery of the transparent film 30A has a shape like the sectional view schematically illustrated in FIG. 3. In the transparent film 30A, all of the cross-sections cut at planes orthogonal to the outer periphery at any position of the outer periphery have the same cross-section. That is, a film thickness t of the transparent film 30A is approximately constant in the vicinity of the boundary line L, and a shape of an end face of the transparent film 30A is approximately vertical to the main surface of the window plate 20.

Figure 4B:
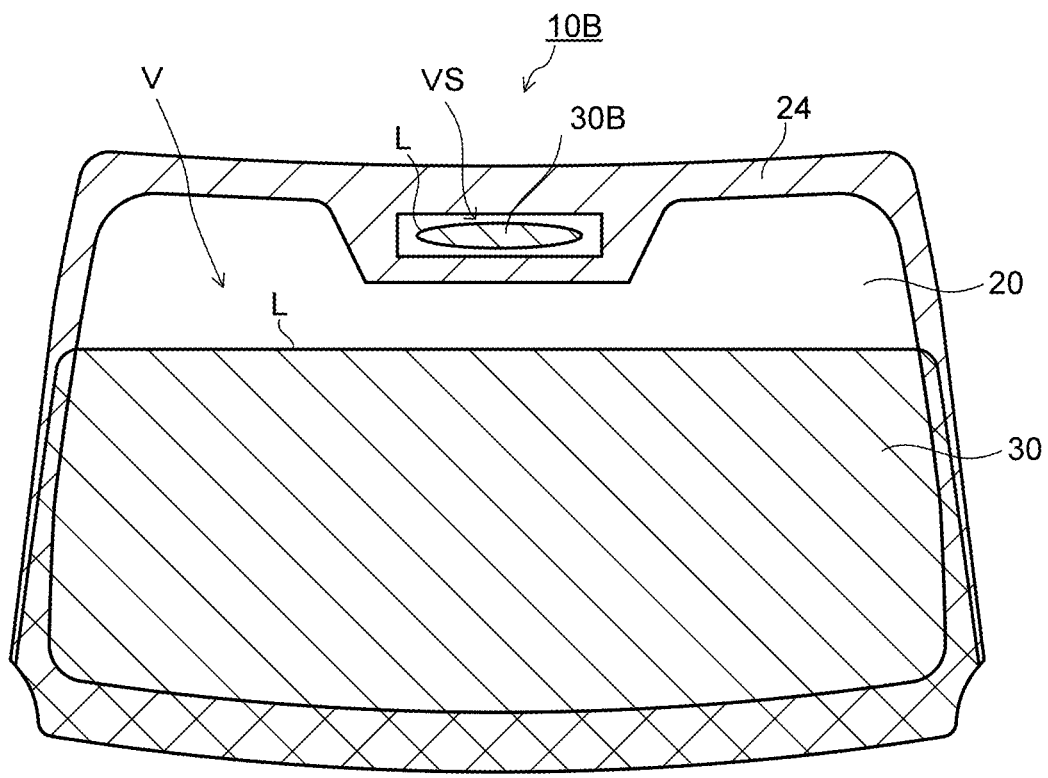
FIG. 4B is a configuration diagram of an example of another embodiment of the vehicle windshield of the present invention.

FIG. 4B is a configuration diagram of an example of another embodiment of the vehicle windshield of this invention. A vehicle windshield 10B illustrated in FIG. 4B illustrates an example of an embodiment of a suitable vehicle windshield of this invention when a sensor is attached thereto. The vehicle windshield 10B includes the window plate 20 similar to the vehicle windshield 10 illustrated in FIG. 1 and the transparent film 30 provided at the surface on the vehicle-interior side of the window plate 20.

The window plate 20 includes the black ceramic layer 24 being the band-shaped layer formed at the whole of the peripheral part. The black ceramic layer 24 is formed to be wide at a center part on the upper side, and a sensor light transmission area VS cut out into a shape whose periphery is surrounded by the black ceramic layer is included at the part formed to be wide. The vehicle windshield 10B includes a transparent film 30B provided in an island shape such that a whole outer periphery is located in the sensor light transmission area VS independent of the transparent film 30.

Shapes and sizes of the sensor light transmission area VS and the transparent film 30B when viewed from a front side are not limited to the shapes and the sizes illustrated in FIG. 4B, and can be appropriately inquired according to a kind, a shape, and purposes of the sensor. For example, these shapes may be a polygon such as a quadrangle, a circular or an elliptical shape. When the transparent film 30B is the antifogging film, it is preferable that a gap with a size of over 1 mm and less than 30 mm exists between the black ceramic layer 24 and the antifogging film so as to suppress yellowish, peeling off, and so on of the antifogging film.

In the sensor light transmission area VS, a boundary between a forming area and a non-forming area of the transparent film 30B accords with an outer periphery of the transparent film 30B. In the vehicle windshield 10B, a whole of the outer periphery of the transparent film 30B is constituted by the boundary line L having the above-stated predetermined characteristics, that is, the boundary line having the characteristics of the present invention where there is no perspective distortion at the boundary between the two areas divided by the boundary line and the line width visually recognized by scattering of irradiated light is 10 μm to 200 μm.

When the vehicle windshield 10B and the sensor are combined to be used, the sensor is provided such that light passing through the sensor light transmission area is incident on a sensor part. When the transparent film 30B is the antifogging film, malfunction of the sensor due to fogging is suppressed, and it becomes possible to design positions of a light shielding part and the antifogging film free from the malfunction of the sensor due to the perspective distortion.

Hereinafter, there is described a forming method of the transparent film whose film thickness in the vicinity of the boundary line L is approximately constant and having an end part shape whose end face is approximately vertical to the main surface of the window plate.

In the vehicle windshield of this embodiment, the transparent film can be formed on the window plate by, for example, a publicly-known wet coating method. The wet coating method is a method preparing a coating liquid containing components which can form the transparent film by means of reaction, drying, and so on and a solvent, applying the coating liquid on a surface where the transparent film is to be formed, that is the main surface of the window plate in the vehicle windshield, and drying and reacting while removing the solvent to form the transparent film.

The wet coating method is suitable for forming a film with a relatively large film thickness of, for example, 3 μm to 30 μm being the preferable film thickness of the transparent film with a uniform film thickness. The transparent film may be formed by using a dry coating method as long as the transparent film having a predetermined film thickness can be formed. Though the forming method of the transparent film described below is performed regarding the wet coating method, for example, a decoating method at an end part can be similarly performed also in the dry coating method.

The applying of the coating liquid on the window plate main surface can be performed by methods such as a flow coating method, a spin coating method, a spray coating method, a flexographic printing method, a screen printing method, a gravure printing method, a roll coating method, a meniscus coating method, a die coating method, and a wiping method.

When the transparent film is made up of the base layer and the upper layer, the transparent film can be formed by, first, applying a coating liquid to form the base layer on the vehicle-interior surface of the window plate, and then applying a coating liquid to form the upper layer to overlap with the base layer. The base layer is preferably formed to be slightly larger particularly on a side of an upper side and on sides of lateral sides than a desired size of the upper layer. This is because an area where sufficient adhesive force cannot be obtained is generated if the base layer does not exist below the upper layer.

The film thickness of the transparent film may become thicker toward a lower part. Such a design enables that the lower area of the vehicle windshield is not further likely to fog up when, for example, the transparent film is the antifogging film. A main part of a visibility area of a driver is often the lower area of the vehicle windshield, and more safety driving is enabled by the constitution as above such that the defogger can be used after the upper area starts fogging.

Here, in the wet coating method, the applying area of the coating liquid becomes the forming area of the transparent film. However, at a tip of the end part of the transparent film obtained by applying, drying and reacting the coating liquid, the film thickness normally decreases gradually from a center side toward an outer peripheral side of the forming area of the transparent film. An appearance of the film thickness gradual decrease at the tip of the end part of the transparent film is, for example, indicated by a broken line as a shape at a side surface before decoating of the transparent film in FIG. 5(B) described below. In the vehicle windshield including the transparent film having the end part with such a shape, the perspective distortion occurs if the boundary between the forming area and the non-forming area of the transparent film exists at the perspective area.

In particular, when the upper side of the transparent film exists at the upper part of the perspective area of the vehicle windshield as each of the vehicle windshields illustrated in FIG. 1 and FIG. 4A, the perspective distortion is likely to be outstanding, and the perspective distortion is likely to occur when the transparent film is a thick film such that, for example, the film thickness exceeds 1 µm. For example, when the transparent film has the stacked structure of two layers, and the base layer is formed larger than the upper layer, the perspective distortion is more likely to be outstanding because both end parts of the base layer and the upper layer exist at the upper side part of the transparent film.

The perspective distortion can be improved by processing a cross-sectional shape of the end part into, for example, the cross-sectional shape illustrated in FIG. 3 so as to suppress the perspective distortion generated at the boundary between the forming area and the non-forming area of the transparent film. As a process method of the end part of the transparent film, there can be cited a method removing (decoating) the part where the film thickness decreases gradually up to an end of an area where the film thickness is constant.

Figure 5:
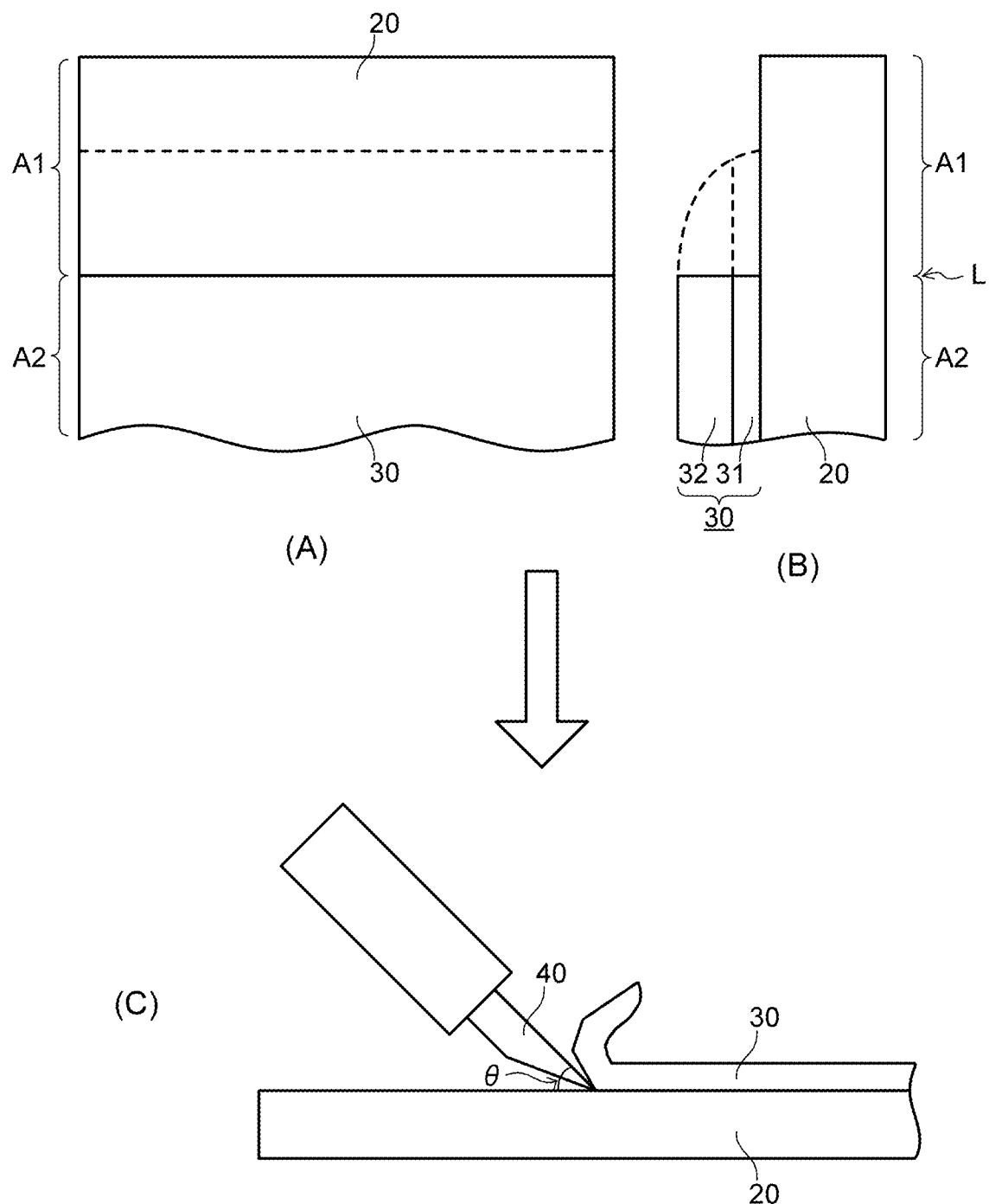
FIG. 5 is a schematic view illustrating a method of decoating a coating film of the vehicle windshield of the present embodiment.

FIG. 5 is a schematic view illustrating a method where, for example, the end part of the transparent film formed by the wet coating method is decoated as above to have the transparent film 30 having the cross-section illustrated in FIG. 3 so as to obtain the vehicle windshield 10 illustrated in FIG. 1. FIG. 5(A) is a top view illustrating a state after decoating the transparent film (transparent film 30) by a solid line, and illustrating a state before decoating the transparent film by a broken line. FIG. 5(B) is a side view illustrating the state after decoating the transparent film (transparent film 30) by a solid line, and the state before decoating the transparent film by a broken line. FIG. 5(C) is a view illustrating an appearance of the decoating by a cutter when viewed from downward of FIG. 5(A).

The cutter used in FIG. 5(C) is, for example, a single-edged cutter 40, and FIG. 5(C) illustrates a state where a cutting edge faces in a direction of the window plate 20. The decoating is performed such that a back of the single-edged cutter 40 on the transparent film 30 side is set to form an angle θ with respect to the window plate 20, and the single-edged cutter 40 is inserted from the tip of the transparent film 30 along the window plate 20 to peel off the transparent film 30. The end part of the peeled transparent film 30 is removed by a proper method at the decoating time. The cutter may be a single-edged cutter or a double-edged cutter. The angle θ when the cutter is inserted is preferably in a range of 40° to 70°, and more preferably in a range of 50° to 60°. The angle θ is set to fall within the above range, and thereby, the line width of the boundary line is easy to be adjusted to 10 µm to 200 µm, preferably 10 µm to 150 µm.

The decoating of the transparent film can be performed by using, for example, laser, grinder, sand blast, resin blast, cutter, and so on. The decoating of the transparent film is preferably performed by using the cutter from among the above because the boundary line L is likely to have good-looking compared to cases using other means.

The vehicle windshield of this invention obtained as stated above may form a vehicle component together with various devices normally used with the vehicle windshield in combination with, for example, a sensor. For example, when the vehicle windshield has a light transmission area surrounded by a light-shielding area as the sensor light transmission area, and the antifogging film is provided in the island shape at the inside of the sensor light transmission area such as the vehicle windshield 10B, the boundary between the forming area and the non-forming area of the antifogging film in the sensor light transmission area may be regarded as the boundary line of this invention. In this case, the sensor is provided such that the light passing through the sensor light transmission area is incident on the sensor part. It is thereby possible to design the positions of the light-shielding part and the antifogging film free from considering malfunction of the sensor due to the perspective distortion while suppressing the malfunction of the sensor due to the fogging, and therefore, there is an advantage such that the sensor light transmission area can be reduced.

Concretely, a sensor which acquires information from a vehicle front side through the coating area A2 or the non-coating area A1 of the vehicle windshield may be attached on the vehicle-interior side of the vehicle windshield. There can be cited an imaging sensor photographing the vehicle front side, a distance measuring sensor measuring a distance to a substance at the vehicle front side, and so on as the sensor. The vehicle component is constituted by the sensor and the vehicle windshield. The vehicle windshield having the constitution such as the vehicle windshield 10B illustrated in FIG. 4B is preferable as the vehicle windshield.

The vehicle component of this invention is a vehicle component including the vehicle windshield of this invention and the sensor which acquires information from the vehicle front side through the vehicle windshield, and the sensor is attached on the vehicle-interior side of the second area of the vehicle windshield, for example, the coating area A2 of the vehicle windshield 10.

When the sensor is attached to acquire the information through the coating area A2, the coating area A2 may be formed into a shape in accordance with a position and a size of the sensor. When the transparent film 30 is the antifogging film, a negative effect on the sensor can be suppressed because the coating area A2 is not likely to fog up even when the non-coating area A1 of the vehicle windshield 10 fogs up, according to such a structure.

The boundary line between the forming area and the non-forming area of the transparent film having the characteristics described above is applicable as the boundary line suppressing the perspective distortion for other components without being limited to the vehicle windshield and the vehicle component.

EXAMPLES

Hereinafter, the present invention is concretely described while citing examples, but the present invention is not limited by these examples.

Example 1

A laminated glass where an interlayer was sandwiched between two pieces of glass plates was used as a window plate. Leaving a predetermined width such that an upper part of a perspective area of the window plate was made to be a first area where a transparent film was not provided, an epoxy resin-based antifogging film made up of a base layer and an upper layer was formed at a whole of a lower part by the wet coating method. The obtained antifogging film was the transparent film where a film thickness decreased gradually at a tip of an end part of a forming area similar to the one indicated by the broken line in FIGS. 5(A) and 5(B). The film thickness of the antifogging film was about 24 μm at an area where the film thickness was approximately uniform (hereinafter, referred to as a "flat part film thickness") except the end part or the like where the film thickness decreased gradually.

The tip of the end part where the film thickness of the antifogging film formed on the laminated glass decreased gradually was decoated up to the position indicated by the solid line in FIGS. 5(A) and 5(B) by inserting a single-edged cutter at θ=53° with respect to the glass to peel off the antifogging film as same as FIG. 5(C), to obtain an antifogging film-attached laminated glass (A). The obtained antifogging film-attached laminated glass (A) is an antifogging film-attached glass including the first area where the transparent film is not provided at the upper part of the perspective area, and the second area where the transparent film is provided at the lower part, and a boundary between the first area and the second area is constituted by the boundary line L which is formed by the decoating.

(Evaluation)

Presence or absence of perspective distortion and a line width of the boundary line L were measured by the above-stated methods regarding the boundary line L of the obtained antifogging film-attached laminated glass (A). In addition, a deviation of an end part film thickness between a position at 1 mm inside from the boundary line L and a position of the boundary line L of the antifogging film was evaluated.

(1) Perspective Distortion

FIG. 6A illustrates a photographed image to determine presence or absence of the perspective distortion of the antifogging film-attached laminated glass (A). In FIG. 6A, the first area is represented by A1, the second area is represented by A2, and the boundary line L is represented by L (hereinafter, the same symbols are used regarding photographed images of examples and comparative examples). As a result, it is evaluated as "perspective distortion is absent" because neither deformation nor discontinuity due to the boundary line L was not recognized in a grid pattern. Though the position of the boundary line L is indicated by a broken line arrow in FIG. 6A, it cannot be recognized from the image. The boundary line L is formed to cross approximately at a center of the image as it can be recognized in, for example, FIG. 9A and FIG. 10A. Hereinafter, when the position of the boundary line L is indicated by the broken line arrow, the boundary line L is in the similar state as above.

(2) Line width of Boundary Line L

Figure 6B:
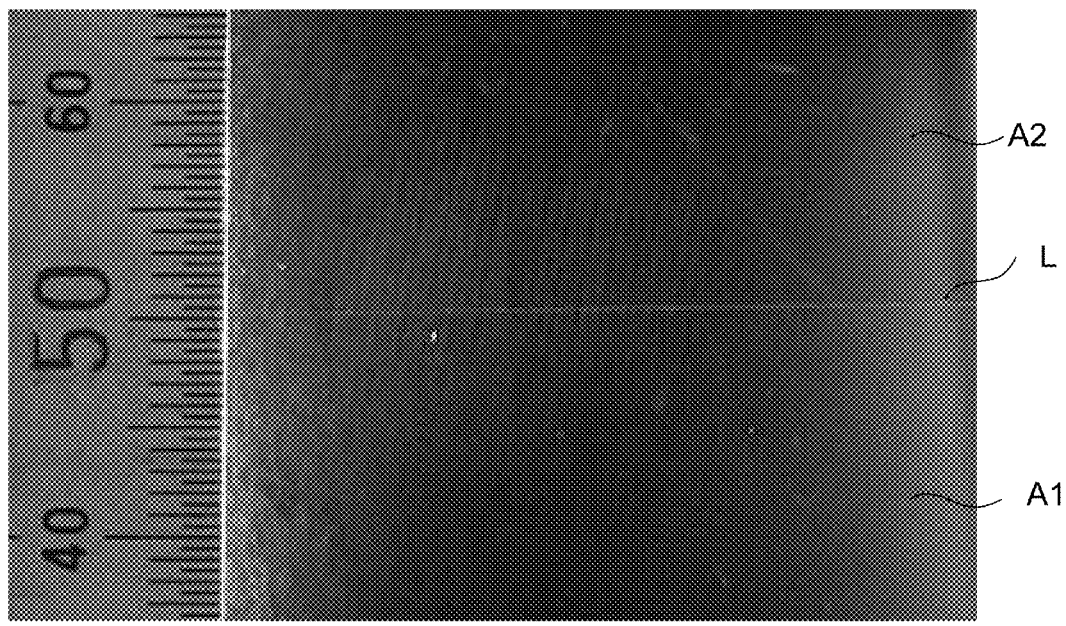
FIG. 6B is an image photographed under line width measuring conditions of a boundary line in Example 1.

FIG. 6B illustrates an image photographed under the above-stated line width measuring conditions of the antifogging film-attached laminated glass (A). The boundary line L is recognized that a boundary line with a predetermined line width is visually recognized by scattering of irradiated light. A maximum value of the line width measured in a direction orthogonal to a length direction of the boundary line L within a length of 100 mm by using a five times enlarged image where the line width of the boundary line L was photographed by the similar method as illustrated in FIG. 6B, that is, the line width in this invention was 50 μm.

(3) Deviation of End Part Film Thickness

A deviation of an end part film thickness being a value (%) obtained by subtracting a minimum value ratio (%) with respect to a maximum value (100%) of the film thickness from 100% was calculated by using a photographed image of a cross-section of the antifogging film-attached laminated glass (A) which was cut at a plane orthogonal to the boundary line L, and the result was 0%, meaning that there was no deviation and the film thickness was uniform.

Examples 2, 3

A flat part film thickness of the antifogging film was set to about 15 μm and an antifogging film-attached laminated glass (B) of Example 2 and an antifogging film-attached laminated glass (C) of Example 3 were obtained as same as Example 1 except that the decoating was performed by inserting a single-edged cutter at θ=40° with respect to the glass to peel off the antifogging film as same as FIG. 5(C) in Example 2, and the decoating was performed by inserting a single-edged cutter at θ=50° with respect to the glass to peel off the antifogging film as same as FIG. 5(C) in Example 3.

Evaluations of (1) to (3) similar to Example 1 were performed regarding the obtained antifogging film-attached laminated glasses (B) and (C).

Figure 7A:
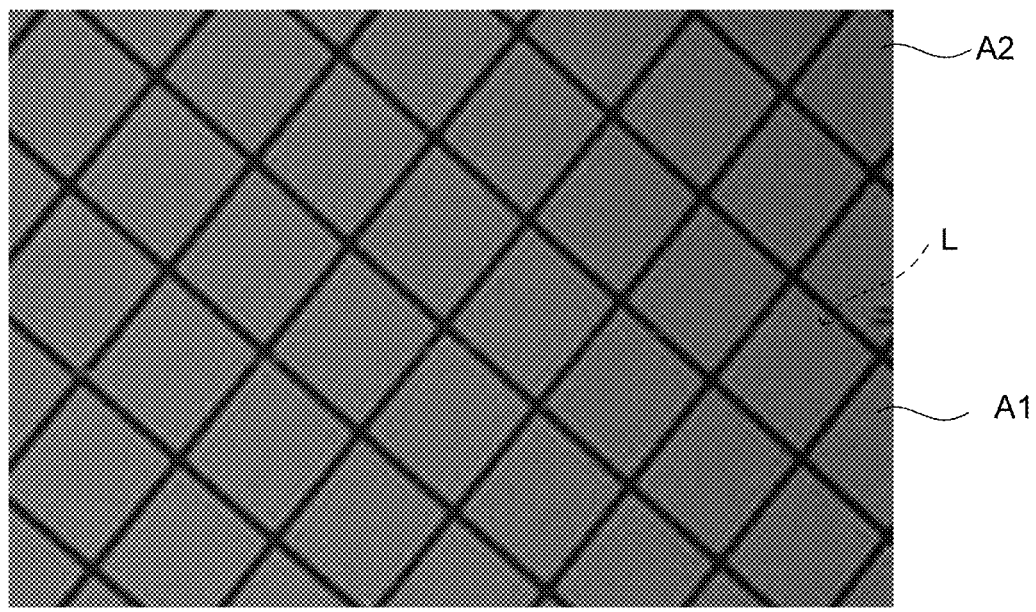
FIG. 7A is a photographed image to evaluate perspective distortion in Example 2.
Figure 7B:
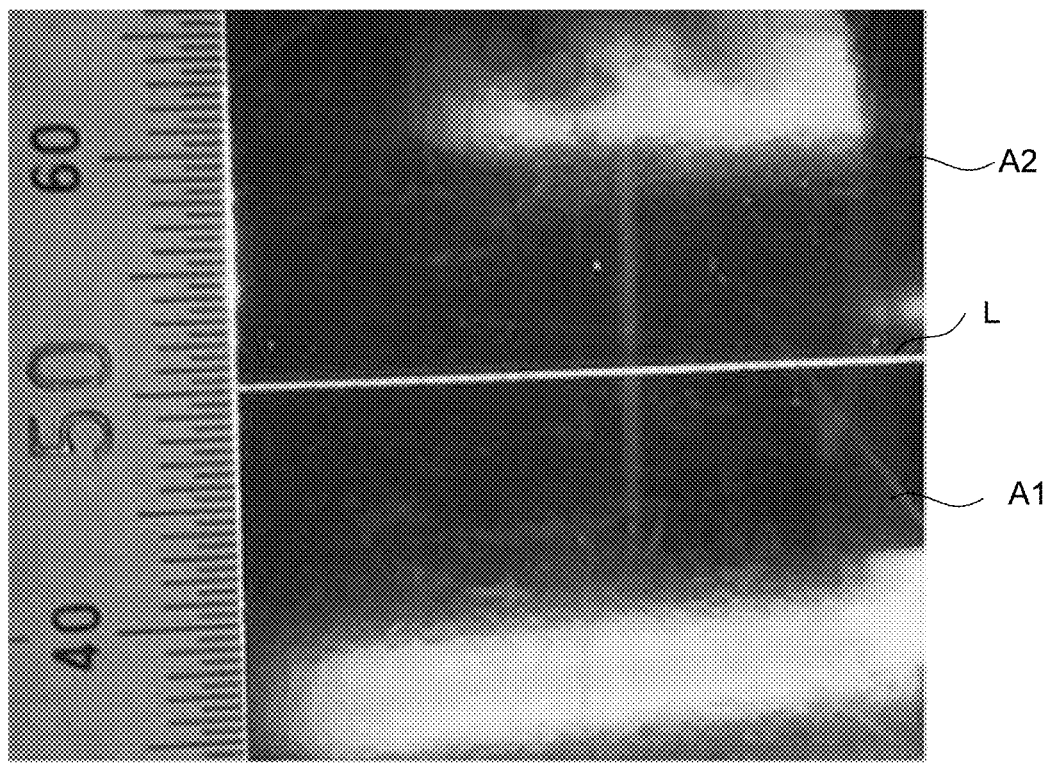
FIG. 7B is an image photographed under line width measuring conditions of a boundary line in Example 2.

FIG. 7A illustrates a photographed image to determine presence or absence of the perspective distortion of the antifogging film-attached laminated glass (B), and FIG. 7B illustrates an image photographed under the above-stated line width measuring conditions of the antifogging film-attached laminated glass (B). It is recognized that there was no perspective distortion due to the boundary line L in the antifogging film-attached laminated glass (B), and a boundary line with a predetermined line width was visually recognized in the boundary line L by scattering of irradiated light from these photographed images. The line width of the boundary line L was 200 μm, and the deviation of the end part film thickness was 0%.

FIG. 8A illustrates a photographed image to determine presence or absence of the perspective distortion of the antifogging film-attached laminated glass (C), FIG. 8B illustrates an image photographed under the above-stated line width measuring conditions of the antifogging film-attached laminated glass (C), and FIG. 8C illustrates an enlarged image (1000 times) photographed under the line width measuring conditions of the antifogging film-attached laminated glass (C). It was recognized that there was no perspective distortion due to the boundary line L in the antifogging film-attached laminated glass (C), and a boundary line with a predetermined line width was visually recognized in the boundary line L by scattering of irradiated light from these photographed images. The line width of the boundary line L was 20 μm, and the deviation of the end part film thickness was 0%.

Comparative Example 1

An antifogging film-attached laminated glass (D) was prepared as an antifogging film-attached laminated glass where the tip of the end part where the film thickness of the antifogging film decreased gradually was not decoated in Example 2, and the evaluations of (1) to (3) similar to Example 1 were performed.

Figure 9B:
FIG. 9B is an image photographed under line width measuring conditions of a boundary line in Comparative Example 1.

FIG. 9A illustrates a photographed image to determine presence or absence of the perspective distortion of the antifogging film-attached laminated glass (D), and FIG. 9B illustrates an image photographed under the above-stated line width measuring conditions of the antifogging film-attached laminated glass (D). It was recognized that there was perspective distortion due to the boundary line L in the antifogging film-attached laminated glass (D), and a boundary line with a predetermined line width was not visually recognized in the boundary line L by scattering of irradiated light from these photographed images. The deviation of the end part film thickness was calculated while setting a film thickness of the base layer as a minimum value of the film thickness because the end part tip has a shape as indicated by the broken line in FIG. 5(B), and the minimum value of the film thickness could not be measured. The result was 80%.

Comparative Examples 2, 3

An antifogging film was formed similar to Example 1 except that a part corresponding to the first area of the laminated glass was masked by using a masking tape with a thickness of 25 μm in Comparative example 2, and a masking tape with a thickness of 55 μm in Comparative example 3, and thereafter, each masking tape was peeled off to obtain an antifogging film-attached laminated glass (E) of Comparative example 2 (flat part film thickness; about 17 μm), and an antifogging film-attached laminated glass (F) of Comparative example 3 (flat part film thickness; about 19 μm). The evaluations of (1) and (3) similar to Example 1 were performed regarding the obtained antifogging film-attached laminated glasses (E) and (F).

Figure 10A:
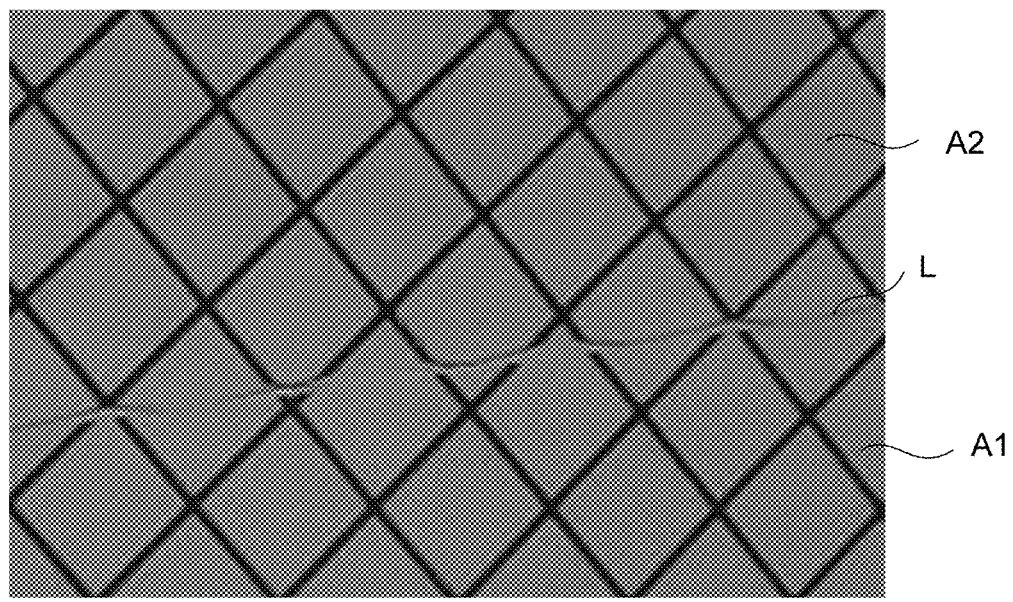
FIG. 10A is a photographed image to evaluate perspective distortion in Comparative Example 2.
Figure 10B:
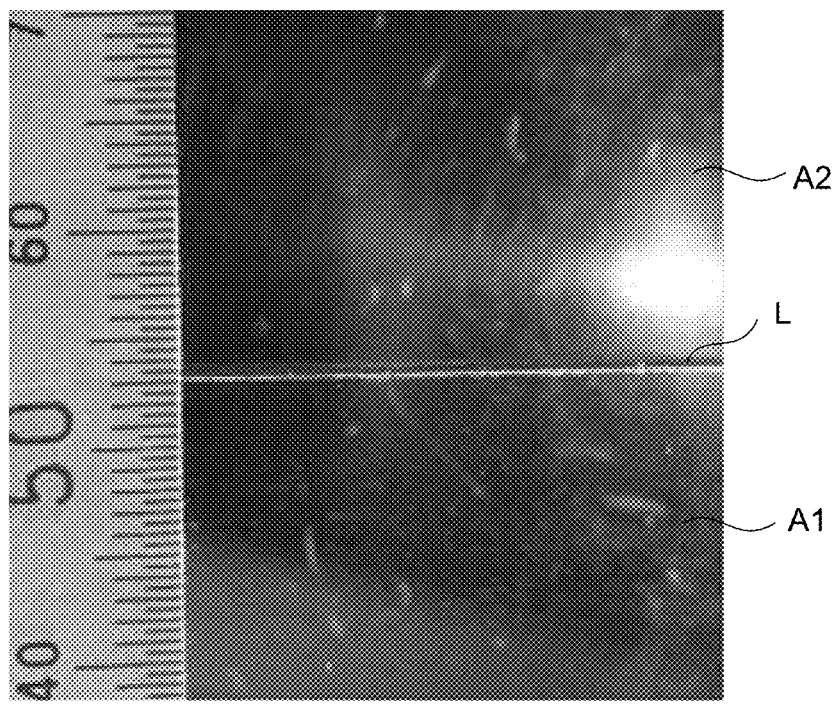
FIG. 10B is an image photographed under line width measuring conditions of a boundary line in Comparative Example 2.

FIG. 10A illustrates a photographed image to determine presence or absence of the perspective distortion of the antifogging film-attached laminated glass (E), and FIG. 10B illustrates an image photographed under the above-stated line width measuring conditions of the antifogging film-attached laminated glass (E). There was perspective distortion due to the boundary line L in the antifogging film-attached laminated glass (E), and a boundary line with a predetermined line width was visually recognized in the boundary line L by scattering of irradiated light from these photographed images. Note that an appearance can also be recognized that the second area side rises along the boundary line in addition to the boundary line which scatters the light. In the antifogging film-attached laminated glass (E), the film thickness of the antifogging film at an end face at the position of the boundary line L was the maximum and it decreases gradually toward an inside, and the deviation of the end part film thickness was 71%.

Regarding the antifogging film-attached laminated glass (F), the perspective distortion due to the boundary line L was recognized. The image photographed under the line width measuring conditions of the antifogging film-attached laminated glass (F) was similar to that of the antifogging film-attached laminated glass (E). The deviation of the end part film thickness of the antifogging film-attached laminated glass (F) was 70%.

Comparative Example 4

The flat part film thickness of the antifogging film was set to about 15 μm, and an antifogging film-attached laminated glass (G) in Comparative example 4 was obtained similar to Example 1 except that the decoating was performed by inserting a single-edged cutter at θ=75° with respect to the glass to peel off the antifogging film as same as FIG. 5(C). The evaluations of (1) to (3) similar to Example 1 were performed regarding the obtained antifogging film-attached laminated glass (G). As a result, though there was no perspective distortion, the line width of the boundary line L was 500 μm, and the deviation of the end part film thickness was 0%. The line width of the boundary line L of the antifogging film-attached laminated glass (G) of Comparative example 4 largely exceeds the line width defined in this invention, and it is difficult to say that a negative effect on the driving visibility is improved compared to a conventional vehicle windshield having perspective distortion. In addition, a design property is bad.

What is claimed is:

1. A vehicle windshield, comprising:
   a window plate;
   a black ceramic layer which is a band-shaped layer formed at a whole of a peripheral part of the window plate, the black ceramic layer having a wide portion at a center part on an upper side of the window plate, a sensor light transmission area being provided in the wide portion such that the sensor light transmission area is surrounded by the black ceramic layer, and
   a transparent film provided in an island shape in the sensor light transmission area at a surface on a vehicle-interior side of the window plate,
   wherein a boundary between an area in which the transparent film is formed and an area in which the transparent film is not formed has no perspective distortion and is constituted by a boundary line having a line width visually recognized by scattering of irradiated light being 10 μm to 200 μm, and
   wherein presence or non-presence of the perspective distortion is determined by:
      setting a test plate A and the vehicle windshield, wherein the test plate A has a grid pattern with an interval of 10 mm formed on a white background by 0.7 mm width black lines in which each black line forms an angle of 45 degrees with respect to a lower side of the test plate A, such that a surface of the test plate A on which the grid pattern is formed and a surface of the vehicle windshield on a side where the transparent film is not formed are in parallel with each other with a distance of 20 mm;
      photographing the surface of the test plate A on which the grid pattern is formed through the vehicle windshield with a camera provided at a distance of 150 mm from a surface of the vehicle windshield on a side where the transparent film is formed such that the boundary line between the coating area and the non-coating area is located approximately at a center in a photographing area; and
      determining that the perspective distortion is present when deformation or discontinuity is visually recognized in the grid pattern, and the perspective distortion is not present when neither the deformation nor the discontinuity is visually recognized in the grid pattern.

2. The vehicle windshield according to claim 1, wherein a gap having a size of over 1 mm and less than 30 mm exists between the black ceramic layer and the transparent film.

3. The vehicle windshield according to claim 1, wherein the transparent film has a stacked structure comprising three layers or more.

4. The vehicle windshield according to claim 1, wherein each of the sensor light transmission area and the transparent film has a polygonal shape when viewed from a front side.

5. The vehicle windshield according to claim 1, wherein a film thickness t of the transparent film is approximately constant in a vicinity of the boundary line.

6. The vehicle windshield according to claim 1, wherein an end face of the transparent film is approximately perpendicular to a main surface of the window plate.

7. The vehicle windshield according to claim 1, wherein formula:

$$100\% - \text{a minimum thickness ratio (\%)} \leq 5\%,$$

is satisfied, wherein the minimum thickness ratio is a ratio of a minimum thickness of the transparent film within an area from an end face of the transparent film to 1 mm toward inside, to a maximum thickness of the transparent film within the area.

8. The vehicle windshield according to claim 7, wherein formula:

$$100\% - \text{a minimum thickness ratio (\%)} \leq 2\%,$$

is satisfied.

9. The vehicle windshield according to claim 7, wherein formula:

$$100\% - \text{a minimum thickness ratio (\%)} \leq 1\%,$$

is satisfied.

10. The vehicle windshield according to claim 2, wherein the transparent film has a stacked structure comprising three layers or more.

11. The vehicle windshield according to claim 10, wherein each of the sensor light transmission area and the transparent film has a polygonal shape when viewed from a front side.

12. The vehicle windshield according to claim 11, wherein a film thickness t of the transparent film is approximately constant in a vicinity of the boundary line.

13. The vehicle windshield according to claim 12, wherein an end face of the transparent film is approximately perpendicular to a main surface of the window plate.

14. The vehicle windshield according to claim 13, wherein formula:

$$100\% - \text{a minimum thickness ratio (\%)} \leq 5\%,$$

is satisfied, wherein the minimum thickness ratio is a ratio of a minimum thickness of the transparent film within an area from an end face of the transparent film to 1 mm toward inside, to a maximum thickness of the transparent film within the area.

15. The vehicle windshield according to claim 14, wherein formula:

$$100\% - \text{a minimum thickness ratio (\%)} \leq 2\%,$$

is satisfied.

16. The vehicle windshield according to claim 14, wherein formula:

$$100\% - \text{a minimum thickness ratio (\%)} \leq 1\%,$$

is satisfied.

* * * * *